United States Patent [19]

Jones et al.

[11] 4,221,279

[45] Sep. 9, 1980

[54] CENTRIFUGAL LUBRICATION SYSTEM FOR TRANSMISSION POCKET BEARING

[75] Inventors: Charles R. Jones, Ottawa Lake, Mich.; Donald C. Schultz, Toledo, Ohio

[73] Assignee: Dana Corporation, Toledo, Ohio

[21] Appl. No.: 700

[22] Filed: Dec. 11, 1978

[51] Int. Cl.$^3$ .............................................. F01M 9/06
[52] U.S. Cl. .................................. 184/11 R; 74/467; 184/6.12
[58] Field of Search ............ 184/6.12, 6, 11 R, 11 A; 74/467

[56] References Cited

U.S. PATENT DOCUMENTS

| | | | |
|---|---|---|---|
| 1,749,247 | 3/1930 | Graham | 184/11 R |
| 1,794,921 | 3/1931 | Ramsey | 184/11 R |
| 2,489,699 | 11/1949 | Clark | 184/11 R |
| 2,517,913 | 8/1950 | Nickle | 74/467 |
| 2,797,771 | 7/1957 | Orr | 184/11 R |
| 2,984,122 | 5/1961 | Woolley | 74/467 X |
| 3,223,196 | 12/1965 | Stott | 184/6 |
| 3,407,902 | 10/1968 | Musser | 74/467 X |
| 3,635,311 | 1/1972 | Kaufman | 184/11 A |
| 3,650,353 | 3/1972 | Abbott | 184/6.12 |
| 3,857,462 | 12/1974 | Kaufman et al. | 184/11 A |

Primary Examiner—David H. Brown
Attorney, Agent, or Firm—Frank B. McDonald

[57] ABSTRACT

A centrifugal lubrication system provides lubrication oil flow to a transmission pocket bearing. Splash and spray lubrication oil is directed from the transmission casing to a collector region along a shaft adjacent the pocket bearing. As the shaft rotates, the oil is centrifugally thrown from the collector region into a receiving trough defined by (a) a lubrication port extending through the shaft, and (b) an oil ring fixed to the shaft radially of the collector region at the lubrication port entrance. From the trough the oil flows through the port exit to the pocket bearing.

10 Claims, 3 Drawing Figures

CENTRIFUGAL LUBRICATION SYSTEM FOR TRANSMISSION POCKET BEARING

TECHNICAL FIELD

This invention relates to bearing lubrication, and more particularly to the lubrication of transmission pocket bearings.

BACKGROUND ART

In a standard transmission, a mainshaft is journalled to an input shaft via a pocket bearing. The latter bearing has been traditionally difficult to lubricate because of its relatively concealed position within a bore in the end of the input shaft.

Conventional devices for providing pocket bearing lubrication have included port holes, grease packs, oil slingers, and hydraulic pumps. Port holes generally are machined radially through transmission input shafts for ducting oil inwardly to pocket bearings. Grease packs are simply large masses of grease in which pocket bearings are packed during assembly of transmissions. Oil slingers and hydraulic pumps involve mechanical pumping actions for providing forced oil flow to pocket bearings.

Port holes have been found deficient in high speed lubrication of transmission input shafts because oil travels inwardly to the pocket bearings only during slow rotation or stoppage of the shaft. At high rotation speeds, centrifugal force throws the oil outwardly rather than inwardly through the port holes, thus starving the bearing at high speeds when lubrication becomes more critical.

Grease packs have been successful at low speeds and under low loading conditions. However, under increased speed and loading conditions grease packs deteriorate rapidly and are, therefore, unsuitable for long-term bearing lubrication.

Operationally, oil slingers and hydraulic pumps have been more successful than port holes and grease packs under high speed and load conditions. However, slingers and pumps are generally more expensive to machine, and often work against rather than with centrifugal force in the movement of lubricant to pocket bearings.

DISCLOSURE OF THE INVENTION

The invention disclosed and claimed herein provides a relatively inexpensive, but very effective, transmission pocket bearing lubrication system in which lubrication efficiency actually increases with the rotational speed of the transmission input shaft. As opposed to many conventional devices of the prior art, a preferred embodiment of this invention includes a stationary annular oil baffle mounted against the transmission input shaft support bearing between the latter bearing and an external bearing cap. The baffle and the bearing cap form an oil passageway through which transmission splash and spray oil is diverted around the suport bearing to a collector region along the input shaft. Adjacent the collector region, a centrifugal oil ring fixed to the input shaft rotates about an annular lip on the baffle, the lip closely surrounding the inside perimeter of the oil ring. A lubrication port extends through the input shaft bearing hub from the collector region to the pocket bearing. As the shaft rotates, oil is centrifugally thrown from the collector region to an oil receiving trough defined by the oil ring and adjoining lubricatin port. A portion of the oil then overflows the receiving trough from the port exit into the pocket bearing. The remainder flows from the oil ring to the support bearing.

DETAILED DESCRIPTION OF PREFERRED EMBODIMENTS

Figure 1:
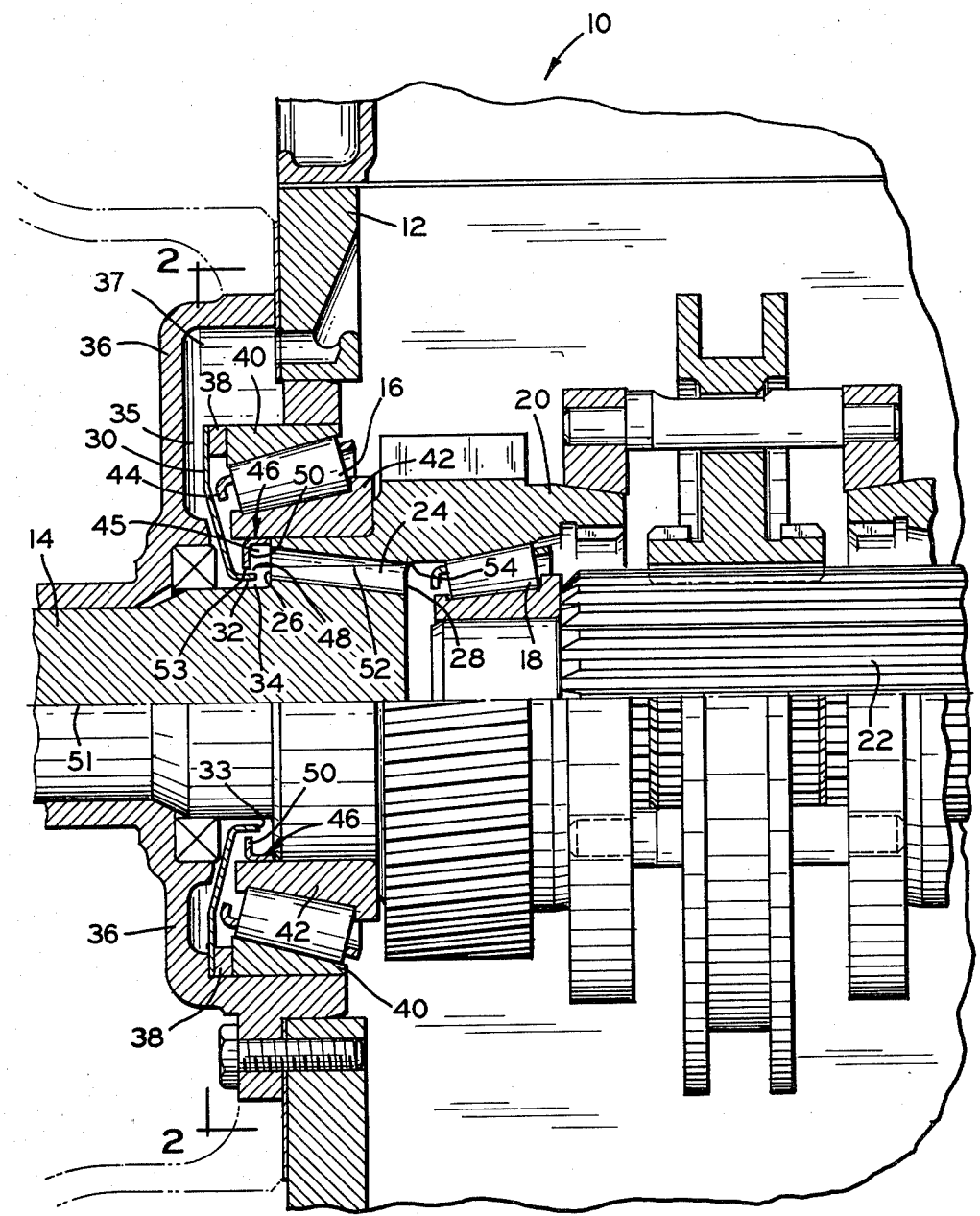
FIG. 1 is an elevation side view in section of a transmission having the pocket bearing lubrication system of this invention.
Figure 2:
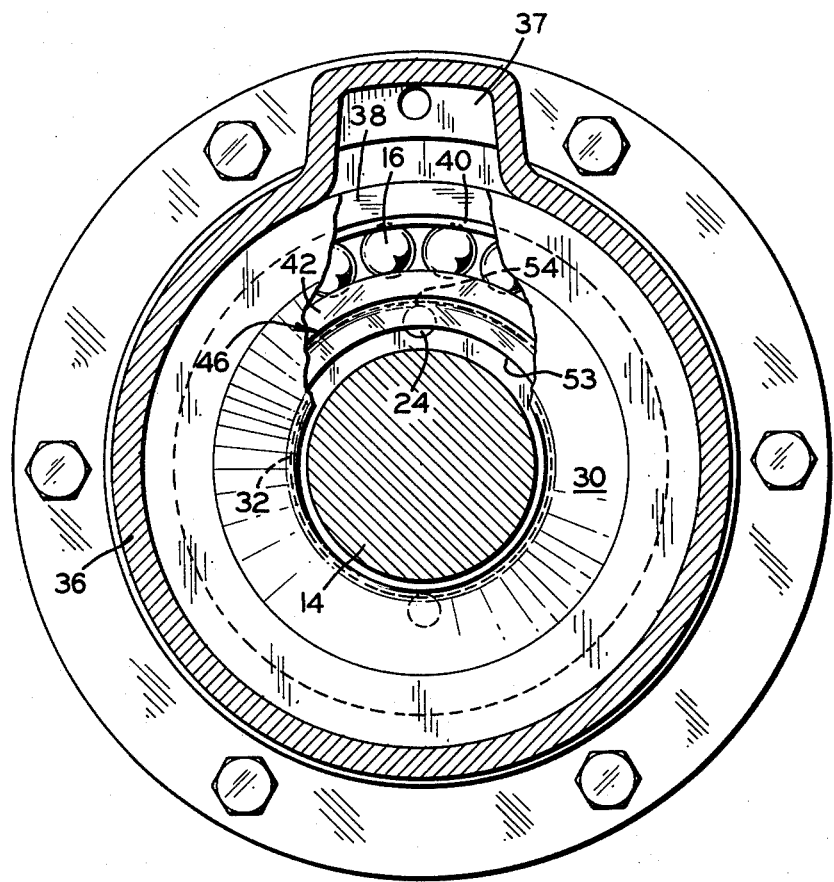
FIG. 2 is a sectional view along line 2—2 of FIG. 1.

FIGS. 1 and 2 depict a preferred embodiment of the transmission pocket bearing lubrication system of this invention. A vehicular transmission 10 includes a housing 12 which contains a rotary input shaft 14. The input shaft is journalled in a support bearing 16, and contains a pocket bearing 18 at the bearing hub end 20 for supporting a splined rotary mainshaft 22 axially aligned therewith.

Two pocket bearing lubrication ports 24 extend through the bearing hub end 20 of the input shaft 14. The ports 24 are spaced 180° about the hub, and have entrances 26 proximal to the support bearing 16, and exits 28 proximal to the pocket bearing 18, as shown.

A stationary oil baffle 30, which includes an axially extending lip 32 is positioned against the support bearing 16. The baffle 30 diverts splash and spray oil around the bearing 16 to a collector region 34 along the shaft and inwardly of the bearing 16. The collector region 34 is defined as the area along the shaft 14 bounded by the extremity 33 of the lip 32 and the port entrance 26. The baffle is positioned between the bearing 16 and a bearing cap 36, the baffle and bearing cap forming a passageway 35 for lubrication oil to flow into the collector region 34. A splash and spray trough 37 acts as a reservoir for the collection of splash and spray oil thrown by the transmission gears and the ducting thereof into the passageway 35. An annular spacer 38 is positioned intermediate the baffle 30 and the outer race 40 of the bearing 16 to assure proper clearance between the baffle and the rotating inner race and cage, 42 and 44 respectively, of the bearing 16.

A rotary centrifugal oil ring 46 extends circumferentially about the lip 32 of the baffle 30, and is affixed to the input shaft 14 adjacent the port entrance 26. From the collector region 34, oil is centrifugally forced outwardly by the rotating shaft 14 and collects in an oil receiving trough 45 defined by the oil ring 46 and adjoining lubrication port 24. The oil pools within the trough 45 until the trough becomes full; a portion of the oil then overflows from the port exit 28 to the pocket bearing 18, and the remainder overflows from the oil ring 46 to the support bearing 16 through the annular clearance space 48 between the oil ring and the lip 32 of the baffle 30.

An internal portion 50 of the centrifugal oil ring 46 extends inwardly toward the shaft 14, as shown in FIG. 1. The internal portion 50 acts as a dam for collection and pooling of oil centrifugally thrown into the oil ring 46 by the rotating shaft. In order to achieve satisfactory pooling of the oil within the oil ring and port, it is necessary that the port extends radially inward toward the centerline of the shaft 14 from the port entrance 26 to the port exit 28 as shown. For providing satisfactory oil flow to both support and pocket bearings, it is suggested that the internal portion 50 have its innermost edge 53 at or below the line 52 drawn parallel to the centerline 51 of shaft 14 and tangent to the outermost point 54 of the port exit 28. The outermost 54 is also shown in FIG. 2.

Figure 3:
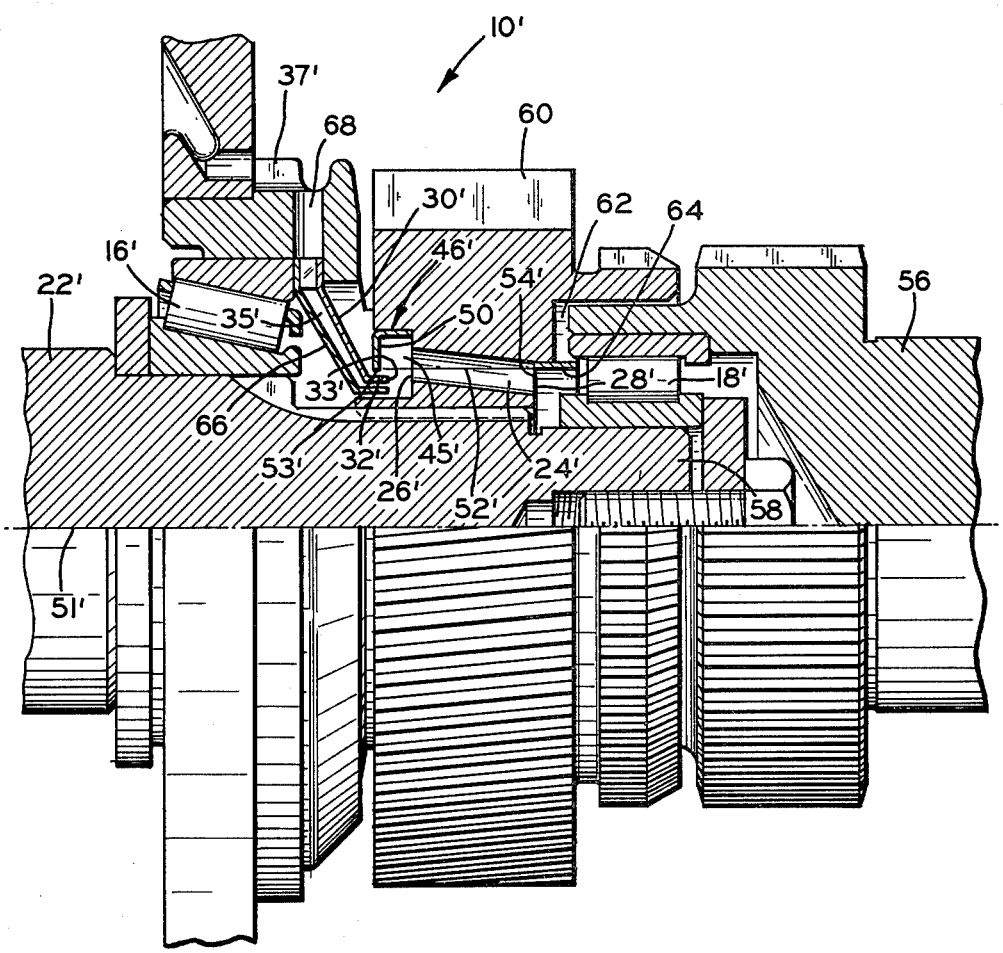
FIG. 3 is a partial side view in section of an alternate embodiment of this invention as used in conjunction with a compound transmission.

FIG. 3 depicts a second embodiment of the transmission pocket bearing lubrication system of this invention. A compound transmission 10' includes a rotary mainshaft 22' journalled in a support bearing 16'. An output shaft 56 is axially aligned with the mainshaft 22' and includes a pocket bearing 18' in which the end 58 of the mainshaft 22' is journalled. As in the first embodiment, a stationary annular oil baffle 30' has an axially extending lip 32' about which rotates an annular rotary centrifugal oil ring 46', the lip closely surrounding the inside perimeter of the oil ring. In the present embodiment, however, the lubrication port 24' extends through an auxiliary input gear 60 splined to the mainshaft 22', with exit 28' spaced from the pocket bearing 18' by gap 62. An annular oil collar 64 is provided to bridge the gap 62, hence restricting the oil from flowing into the gap 62 upon leaving the port exit 28, ensuring that upon leaving the port exit 28', the oil flows directly into the pocket bearing 18'. The lubrication port 24' of this embodiment extends through a gear or the shaft rather than through the bearing hub of the shaft as in the first embodiment. For purposes of this invention, however, the input gear 60 is defined as a radially extending portion of the shaft 22; so that in either embodiment the lubrication port may be said to extend through a shaft.

The system of FIG. 3 also includes a second stationary annular oil baffle 66 adjacent the baffle 30' for the purpose of providing a passageway 35' for splash and spray oil from an oil inlet 68 which adjoins the splash and spray trough 37'. The oil baffle 66 in this regard serves the same function as the bearing cap 36 of the first embodiment.

Also as in the first embodiment, the oil ring 46' in the compound gearbox system of FIG. 3 includes an internal portion 50' which extends inwardly toward the mainshaft 22'. In the system of FIG. 3, however, there is no purpose served by allowing the oil to overflow from the oil ring. Thus, the innermost edge 53' of the internal portion 50' should in this case be radially inward of the line 52' (parallel to centerline 51' and extending through the outermost point 54' of port exit 28').

Aside from the foregoing modifications, all of the principles applicable to the first embodiment apply to the second embodiment.

Having thus described the preferred embodiments of this invention, what is claimed is:

1. A transmission having:
   (a) a first shaft,
   (b) a pocket bearing contained within said first shaft,
   (c) a second shaft journalled within said pocket bearing,
   (d) an oil collector region adjacent one of said shafts,
   (e) a lubrication port through said one of said shafts, said port having an entrance in communication with said oil collector region and an exit in communication with pocket bearing,
   (f) means for collecting lubrication oil, said means located radially outwardly of said collector region whereby oil is thrown centrifugally radially outwardly of said collector region, is held within said means under centrifugal force, and overflows said means into said pocket bearing, and
   (g) means for providing lubrication oil to the collector region.

2. The transmission of claim 1 further comprising an oil ring, wherein said means for collecting lubrication oil is an oil receiving trough defined by said lubrication port and said oil ring.

3. The transmission of claim 1 or 2 wherein said means for providing lubrication oil to the collector region comprises a stationary annular oil baffle having an axially extending lip, said lip extending to said collector region.

4. The transmission of claim 3 wherein said means for providing lubrication oil to the collector region further comprises a splash and spray trough and a passageway, wherein said splash and spray trough leads to said passageway and said passageway leads to said collector region.

5. The transmission of claim 4 wherein said oil ring circumferentially surrounds the lip of said baffle to define an annular clearance space therebetween for overflow of oil from said ring to a shaft support bearing.

6. The transmission of claim 5 wherein said passageway is defined by a bearing cap and said stationary oil baffle.

7. The transmission of claim 6 wherein said oil ring includes an internal portion having an innermost edge, and wherein said port exit has an outermost point, said innermost edge extending radiallly inward toward the centerline of said input shaft, said innermost edge being at least as proximal to said centerline as said outermost point is proximal to said centerline.

8. The transmission according to claim 4 further comprising an annular oil collar adjacent to said port exit, said collar extending into said pocket bearing so as to conduct lubrication oil from said port to said pocket bearing.

9. The transmission according to claim 8 further comprising a second stationary annular oil baffle, which with said first baffle defines a passageway for conducting said lubricating oil to said collector region.

10. The transmission according to claim 9 wherein said oil ring includes an internal portion having an innermost edge, and wherein said port exit has an outermost point, said innermost edge extending radially inward toward the centerline of said input shaft, said innermost edge being more proximal to said centerline than said outermost point is proximal to said centerline.

* * * * *